United States Patent [19]

Neely, Jr.

[11] 3,929,442
[45] Dec. 30, 1975

[54] TEMPERING GLASS SHEETS BY HEAT OF SUBLIMATION

[75] Inventor: James E. Neely, Jr., Butler, Pa.

[73] Assignee: PPG Industries, Inc., Pittsburgh, Pa.

[22] Filed: May 7, 1974

[21] Appl. No.: 467,766

[52] U.S. Cl. .................. 65/114; 65/104; 65/351
[51] Int. Cl.² ................................ C03B 27/00
[58] Field of Search ............ 65/104, 118, 115, 116, 65/348, 349, 350, 351

[56] References Cited
UNITED STATES PATENTS

| | | | |
|---|---|---|---|
| 2,131,406 | 9/1938 | Mosmieri et al. | 65/349 |
| 3,764,403 | 10/1973 | Neely, Jr. | 65/114 X |

*Primary Examiner*—Arthur D. Kellogg
*Attorney, Agent, or Firm*—Edward I. Mates; Thomas F. Shanahan

[57] ABSTRACT

This invention relates to tempering glass sheets using the heat of sublimation of a sublimable cooling medium to help cool heated glass sheets sufficiently rapidly to impart at least a partial temper thereto. The cooling medium is produced when a liquid stored in a refrigerated, pressurized condition in a closed system is applied to a system of small apertures facing the opposite surfaces of a heated glass sheet and is imparted from said apertures toward said opposite surfaces as a mixture of soft, small, solid sublimable particles in an expanding gas of the cooling medium. Preferably, the cooling medium contains carbon dioxide as the primary source of cooling, the apertures are distributed in widely spaced relation to occupy less than 5% and preferably less than 1% of the area facing the glass surface during cooling. The closed delivery system comprises a plurality of spaced apertured pipes that occupy a maximum of 25% of the area facing the glass surface, thus leaving 75% of the area facing the glass surfaces free for exhaust passages.

6 Claims, 7 Drawing Figures

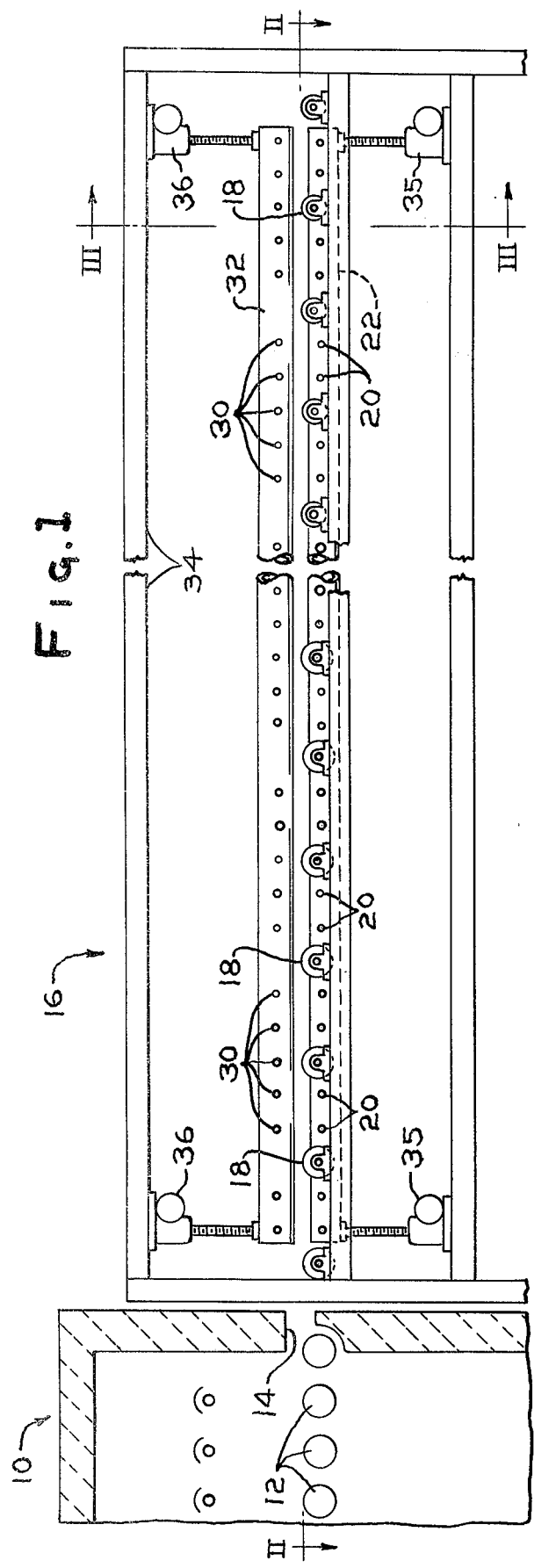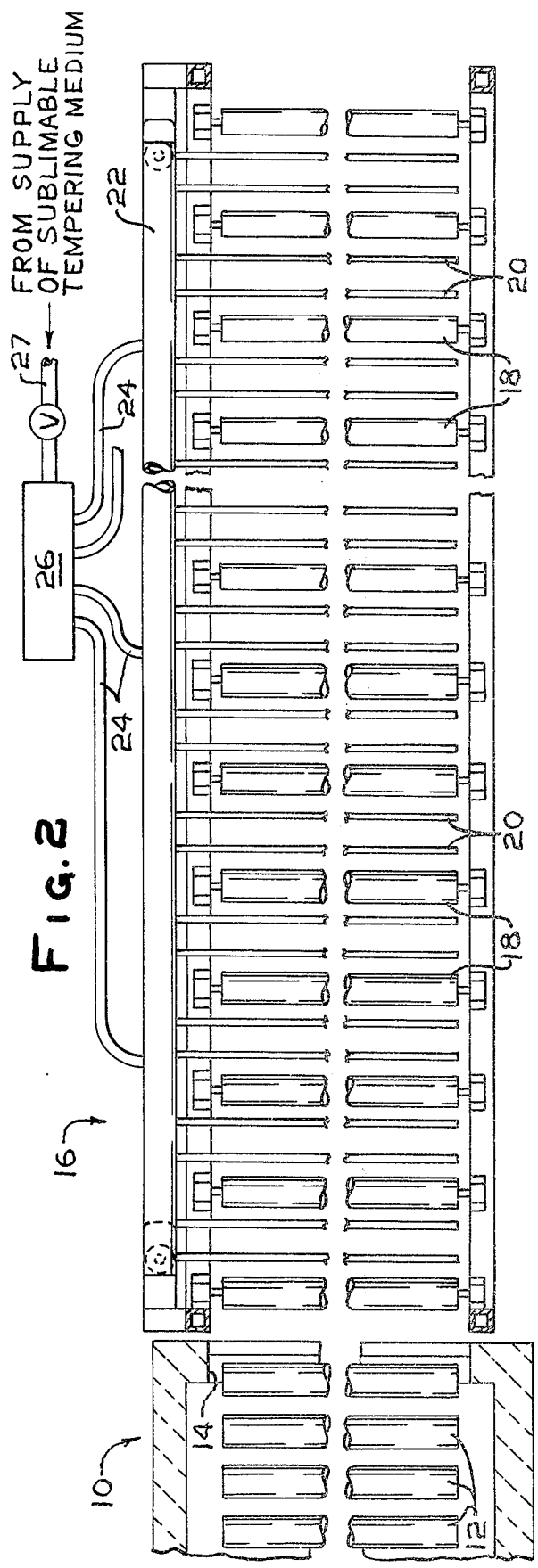

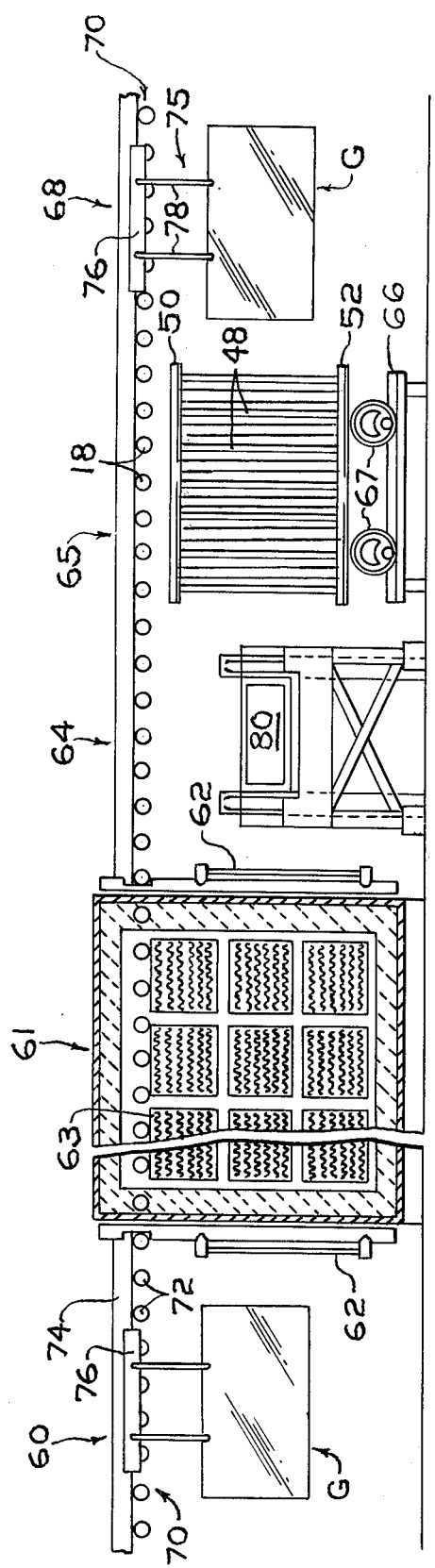

TEMPERING GLASS SHEETS BY HEAT OF SUBLIMATION

BACKGROUND OF THE INVENTION

This invention relates to tempering glass sheets, and particularly relates to tempering glass sheets by using the heat of sublimation of a composition containing soft particles of a sublimable material such as solid carbon dioxide particles in the form of snow to chill the opposite surfaces of a heated glass sheet sufficiently rapidly to impart a temper thereto. This technique has been identified by the term "sublimation quenching."

Prior to the present invention, as depicted in U.S. Pat. No. 3,764,403 to Neely, glass sheets were tempered using sublimation quenching by aligning a heated glass sheet between spaced nozzles of truncated conical shape having a minimum 4 inch space between the nozzle openings. While such a tempering operation using sublimable particles of carbon dioxide snow succeeding in tempering glass sheets as thin as 0.185 cm. (73 mils), which provided a significant improvement over results obtained by quenching using air blasts and avoided the problems associated with tempering involving quenching hot glass in a liquid, the volume of sublimable cooling medium needed for adequate tempering by the system disclosed in the patent made the operation fairly expensive. A need still existed for reducing the total amount of sublimable cooling medium needed to temper a given area of glass sheet to reduce the cost of tempering by the so-called "sublimation quenching" method.

SUMMARY OF THE INVENTION

The present invention provides a method of tempering glass sheets utilizing soft sublimable particles of a solid material such as carbon dioxide to temper a heated glass sheet in a more efficient manner than the prior art. This results from the application of the soft sublimable particles from a series of very small apertures facing each glass surface. The apertures are distributed throughout an area that faces one or the other major surface of the glass sheet undergoing quenching. The total cross-sectional area of the apertures is less than 5% of the area of the glass sheet. In an illustrative embodiment of the invention, the sublimable cooling medium is dispensed through opposing arrays of apertures while the latter are maintained at a distance of less than 5 centimeters from the glass surfaces and the apertures in each array have a maximum diameter of approximately 1 millimeter (0.04 inch). However, the apertures may be reduced in frequency per unit area and made larger with increasing distance between the apertures and the facing glass surfaces provided the total area of the apertures remains less than 5% and preferably less than 1% of the area of the glass sheet the apertures face.

The soft sublimable particles result when a refrigerated, pressurized liquid, preferably carbon dioxide, is released from an enclosed storage system through two arrays of apertures, each array facing one or the opposite major surfaces of a heated glass sheet. A portion of the liquid evaporates to form an expanding gas in the vicinity of each aperture upon the reduction of pressure that results when the liquid leaves the enclosed storage system, and chills an adjacent volume of liquid to below the freezing point to form soft, solid particles of sublimable material. The liquid escapes through each aperture at an escape velocity which is imparted to the sublimable particles when the latter form. The gas that results when the liquid evaporates expands to carry the solid particles over a widening area toward the glass surface to permit the particles to approach the glass surfaces in sufficiently close proximity to provide a high heat exchange between the subliming particles and the hot glass surface. A sufficient number of soft sublimable particles from each aperture move substantially parallel to the glass surface to provide a high heat exchange over an area of the glass that is many times larger than the area of the aperture. The particles from the array of apertures cover the glass surface to form a cloud-like appearance over the entire glass surface.

The soft particles of sublimable material are delivered from a system of small apertures spaced from the opposing glass surfaces. The apertures are arranged in two arrays of apertures, each arranged in some regular pattern to face one or the other surface of the glass sheets. While the apertures in each array are spaced from each adjacent aperture a distance that is very much greater than the diameter of each aperture, the blast from each aperture merges with those from other apertures in each array to cover the entire glass surface with a blanket of snow of soft, sublimable, solid particles, even though the total area of the apertures is less than 5 percent, and preferably even less than 1 percent of the area of glass sheet surface it faces.

To chill the opposite glass surfaces even more uniformly, the glass sheet may be moved relative to the arrays of apertures between the spaced arrays of apertures while applying the cooling medium. In a preferred embodiment of the present invention, the relative motion is at a relatively high initial velocity and then at a slower velocity. As an alternative, the arrays of apertures may be moved relative to the glass sheet while imparting the cooling medium containing the soft, sublimable solid particles from the system of apertures toward the hot glass surfaces. This latter movement may by a linear or arcuate reciprocation or circular or elliptical orbital motion or any other cycle of movements well known in the glass tempering art.

The soft particles of sublimable, solid material can be applied against the opposite surfaces of a heated glass sheet at a mass per unit area considerably higher than the practical maximum for delivering air blasts under pressure, even though the velocity of the blasts of the solid sublimable particles is less than the velocity normally found in tempering glass using air blasts. Since soft sublimable particles are imparted against the hot glass surfaces at a velocity that is less than that used with air blasts, the present invention provides less danger of imparting surface distortion to the glass due to impingement of high velocity blasts than is the case when the hot glass surfaces are chilled by air blasts.

Apparatus for performing the method according to the present invention comprises a plurality of spaced, narrow delivery pipes each having apertures of small diameter. The small apertures in the pipes delivering the carbon dioxide particles toward the glass provide a total area of apertures that is less than 5%, and even less than 1%, of the total area of glass sheet being cooled. This allows the use of narrow pipes widely spaced from one another. Glass tempering systems employing nozzles through which air blasts are delivered require the air delivery system to occupy a much larger percentage of the area facing the surface of glass to be cooled. This feature enables the present invention to provide a larger area for escape of medium than is practical to provide with glass tempering apparatus using air blasts.

The apertured pipes occupy only a small portion of the area aligned with and facing the major glass sheet surfaces, preferably not exceeding 50% of said area. This leaves at least 50% of the area facing the glass sheet available for exhaust purposes.

The apparatus aspect of the invention also comprises a source of refrigerated, pressurized liquid of a material capable of sublimation, and an enclosed delivery system. The refrigerated source stores the liquid at a pressure of at least 10 atmospheres and preferably greater. The delivery system comprises two arrays of parallel apertured pipes spaced from one another on opposite sides of a position occupied by a hot glass sheet. Each pipe has spaced apertures, each having a maximum diameter of approximately 1 millimeter disposed equal distances along the length of each pipe.

The apparatus may also include means for providing relative movement between the heated glass sheet and the apertured pipes. Each array of apertured pipes is supported at a preferred distance from the other array of less than 10 centimeters for handling relatively small sheets (up to about 30 cm. square). The separation distance between arrays may be made adjustable and is usually greater in apparatus for handling relatively large sheets. When the arrays are separated from the opposite glass sheet surfaces by greater distances than those preferred for smaller sheets, larger apertures are used with greater spacing between adjacent apertures.

The invention will be understood more clearly in the light of the descriptions of illustrative embodiments that follow.

BRIEF DESCRIPTION OF THE DRAWINGS

In the drawings that form part of the description of the illustrative embodiments and wherein like reference numbers refer to like structural elements, FIG. 1 is a longitudinal elevational view of an embodiment of the present invention wherein glass sheets are processed while moving horizontally along a horizontally disposed conveyor;

FIG. 2 is a sectional view in a horizontal plane taken along the lines II—II of FIG. 1;

FIG. 7 is a longitudinal view of a further alternate embodiment of the present invention comprising a furnace and a cooling station arranged along a horizontal path with movable arrays of apertured pipes at the cooling station.

DESCRIPTION OF THE PREFERRED EMBODIMENTS

Figure 3:
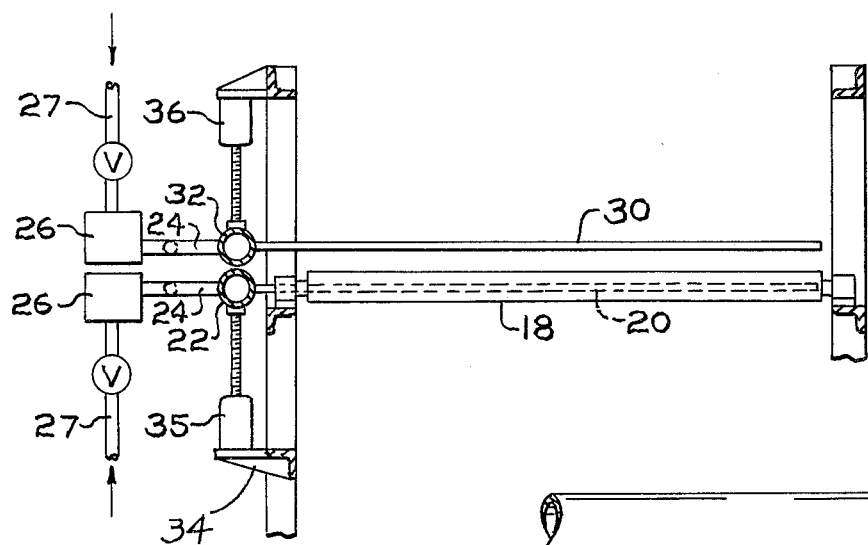
FIG. 3 is a cross-sectional view taken along the line of III—III of FIG. 1.
Figure 4:
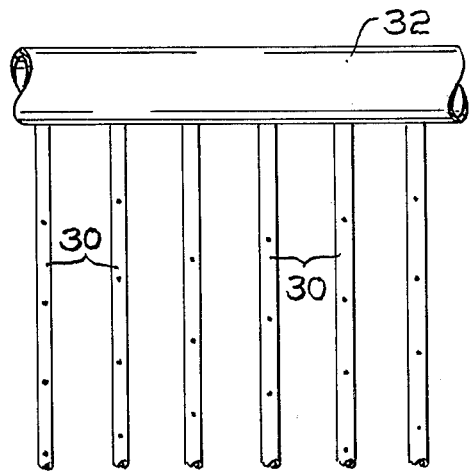
FIG. 4 is an enlarged fragmentary detailed view of the arrangement of a pair of adjacent pipes forming part of the apparatus embodiment depicted in FIGS. 1 to 3.

The embodiments illustrated in FIGS. 1 to 6 were used to temper glass sheets one foot square (30.48 cm. by 30.48 cm.) of various thicknesses using the sublimation quenching technique. The embodiment of FIG. 7 is appropriate for fabricating larger parts on a mass production basis.

Referring to FIGS. 1 to 4, a horizontally extending tunnel like furnace 10 is provided with a series of furnace conveyor rolls 12, each mounted to extend horizontally across the width of the furnace at a 3 inch roll to roll spacing. A narrow horizontally extending slot 14 is located at the end of the furnace for passing a succession of glass sheets from the furnace 10 to a cooling station 16.

The cooling station 16 contains a plurality of cooling station conveyor rolls 18, the first 12 of which are ¾ inch in diameter and the last 10 of which are ⅝ inch in diameter. The rolls 18 are spaced 3 inches apart to provide a continuation of a glass conveying system provided by the furnace conveyor rolls 12 through the furnace 10.

The conveyor rolls rotate to propel glass sheets through the furnace and the cooling station along a path defined by a tangential plane common to the upper surfaces of conveyor rolls 12 and 18.

Between each of the cooling station conveyor rolls and at equally spaced distances are two lower apertured pipes 20. The pipes are of brass tubing and are 15 inches (38.1 cm.) long of 3/16 inch (0.476 cm.) outer diameter, having a wall thickness of 0.035 inch (0.09 cm.) with an aperture of 0.025 mils (0.06 cm.) drilled every 1 inch (2.54 cm.) of length along the middle 11 inches (27.94 cm.) of said lower apertured pipe for a total of 12 apertures per pipe.

The left ends (FIG. 3) of the lower apertured pipes 20 communicate with apertures in a lower manifold 22. The lower manifold 22 has an outer diameter of 2.54 cm. (1 inch), an inner diameter of 1.91 cm. (¾ inch) and is 132.2 cm. (56 inches) long and is provided with 16 apertures along its middle 54 inches (137.16 cm.) of length at 3 to 4 inch (7.62 to 10.16 cm.) spacing therebetween. A hydraulic hose 24 having a nominal inner diameter of 6.4 mm. (¼ inch) communicates with the lower manifold 22 at each aperture therealong. The hydraulic hoses 24 originate at a premanifold 26 which is an aluminum tube of square cross-section approximately 10 inches long and ⅞ inch (2.22 cm.) inner bore with 4 holes drilled in each of its 4 walls to receive the 16 hydraulic hoses 24 that connect the premanifold 26 to the lower manifold 22. A high pressure hose 27 having an inner diameter of 1 inch (2.54 cm.) and valved at V connects the premanifold 26 to a storage tank of refrigerated, pressurized, liquid carbon dioxide (not shown).

The cooling station 16 also includes a series of upper apertured pipes 30 identical in construction to the lower pipes 20 and communicating with an upper manifold 32 which is identical to the lower manifold 22. The upper manifold 32 is also connected to a premanifold 26 through hydraulic hoses 24 identical to those provided for the lower apertured pipes 20. The upper apertured pipes 30 are arranged with their apertures facing downward whereas the apertures in the lower apertured pipes 20 face upward. The upper apertured pipes are arranged in sets of five pipes spaced 1 inch (2.54 cm.) apart within the set and 2 inches (5.08 cm.) apart from set to set so that in each set of five upper apertured pipes 30, one of the pipes faces a cooling station conveyor roll 18 whereas the other four pipes face a corresponding lower apertured pipe 20. The space between sets of upper apertured pipe sets faces alternate rolls 18.

The apertures in the upper and lower apertured pipes are arranged in offset relation between adjacent pipes so that a line connecting these apertures extends at an angle of approximately 14 degrees to the axis of the path taken by glass sheets through the conveyor system defined by the furnace conveyor rolls 12 and the cooling station conveyor rolls 18. Corresponding apertures of the upper pipes 30 are vertically aligned with apertures of the lower pipes 20.

The aperture density of the upper pipes was 120 per square foot (1290 per square meter) and for the lower pipes was 96 per square foot (1033 per square meter). The apparatus used for the experiments reported later had 552 upper apertures and 444 lower apertures. The apertures occupied 0.015% of the area and the pipes and conveyor rolls left escape paths therebetween of 84% of the area facing the upper glass sheet surface and 62% of the area facing the lower glass sheet surface.

The lower manifold 22 is supported on a frame structure 34 and a series of jacks 35 are used to adjust the vertical position of the lower apertured pipes 20 relative to the path of glass sheet travel. A series of upper jacks 36 adjust the vertical position of the upper manifold 32 to adjust the vertical position of the upper apertured pipes 30 relative to said path.

The cooling station conveyor rolls 18 are driven by a variable speed motor (not shown) through a commercially available timer circuit, although manual control may be exercised, if desired. Generally, the furnace conveyor rolls 12 operate at a constant speed except for a short series of rolls 12 near the furnace exit that are adapted to be clutched to the variable speed motor that initiates rapid movement of the glass sheet for a time sufficient to transfer the glass sheet into the cooling station 16 after which the furnace conveyor rolls 12 are disconnected from the variable speed motor and the latter operates only the rolls 18 according to a prearranged program of velocity. Conveyor systems for moving glass sheets at a cycle of different velocities throughout the system is well known in the art and is not part of the present invention, but is described generally because such a system is useful in the apparatus embodiments of this invention.

EXAMPLE I

The apparatus of FIGS. 1 to 4 as described previously was used for the following examples. Sheets 30.48 cm.$^2$ and 3 mm. thick (12 inches square by ⅛ inch thick) of commercial float glass of conventional soda-lime-silica composition were heated to 1210°F. (654°C.) and conveyed on the rolls 18 at a velocity of approximately 20 inches (54.8 cm.) per second for the first two feet (60.96 cm.) of the cooling station and then the speed was reduced so that it took the glass 4 to 5 seconds to traverse the cooling station. Sheets so treated developed a surface compression stress of 27,000 to 30,000 psi (80,000 to 88,000 kg/cm$^2$) when the apertured pipes were disposed at ½ inch (1.27 cm.) separation between each glass surface and the opposing apertures of the upper and lower pipes of the apparatus of FIGS. 1 to 4 previously described. Liquid carbon dioxide was stored at a pressure of 280 ± 20 psi (819 ± 58 Kg/cm$^2$) and delivered at a rate of approximately 0.013 pounds (4.85 grams) per second per aperture for the upper apertures and 0.014 pounds (5.12 grams) per second per aperture for the lower apertures.

EXAMPLE II

Float glass sheets of the same size as in Example I were heated to 1240°F. (671°C.) in the furnace and cooled while moving through the cooling station at the same speed cycle as described previously. These sheets developed 28,000 to 31,000 pounds per square inch (83,000 to 92,000 Kg/cm$^2$) surface compression stress using the same cooling conditions as previously recited.

EXAMPLE III

Glass sheets of the same area as in Example I, but having a thickness of 2.5 mm (0.098 inch) were heated to approximately 1200°F. (649°C.) and passed through the cooling station at the same speed cycle as in Example I. The pipe to glass distances were 1 inch (2.54 cm.) for both surfaces, the pressure of the liquid $CO_2$ was 260 ± 10 psi. (770 ± 29 Kg/cm$^2$) and the liquid was delivered to the upper apertures at a rate of approximately 0.012 pounds (4.48 grams) per second per aperture and to the lower apertures at a rate of approximately 0.013 pounds (4.85 grams) per second per aperture. The glass sheets so treated developed a surface compression stress of about 20,000 psi (59,000 Kg/cm$^2$).

Figure 5:
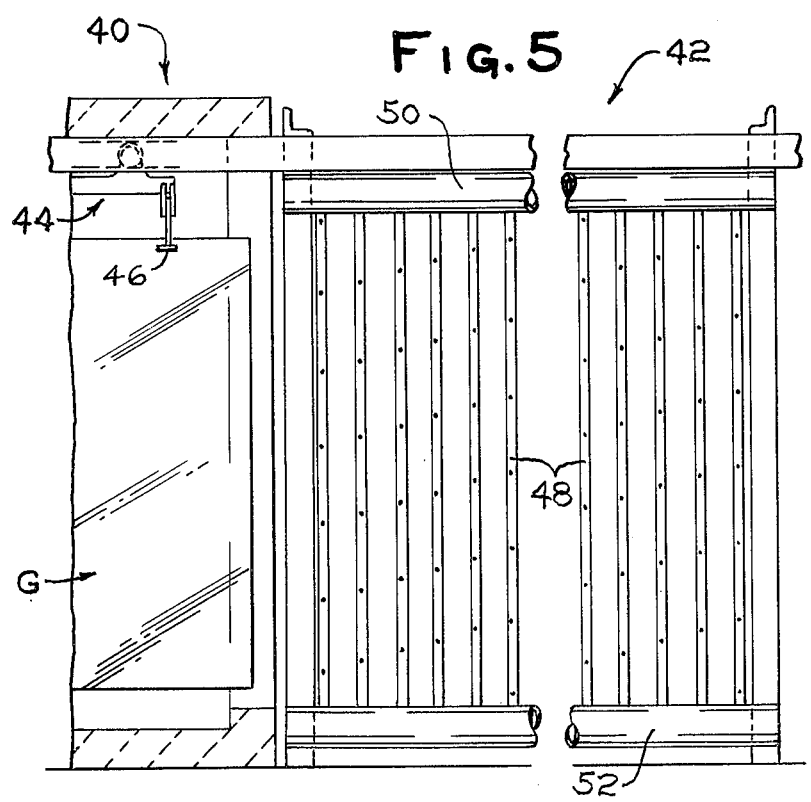
FIG. 5 is a fragmentary, vertical longitudinal sectional view of an alternative embodiment of the present invention wherein glass sheets are treated while oriented vertically.
Figure 6:
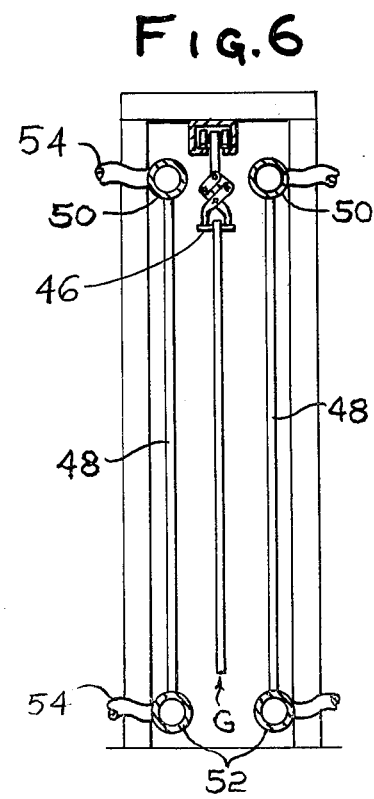
FIG. 6 is a cross-sectional view of the embodiment of FIG. 5 showing the view at right angles to that of FIG. 5.

FIGS. 5 and 6 refer to an alternate embodiment of glass tempering apparatus for supporting glass in a vertical plane while it is processed. This embodiment comprises a horizontally extending furnace 40 having a vertical slot opening (not shown) and a cooling station 42 and is provided with an overhead conveyor system for moving a series of tong supported carriages 44, each provided with one or more self-closing tongs 46 through the furnace 40 and through the cooling station 42. In this embodiment, a series of vertically extending apertured pipes 48 are disposed on either side of the path taken by the glass sheets through the cooling station 42.

For treating glass sheets 12 inches (30.48 cm.) square, each pipe is composed of brass tubing 15 inches (81.6 cm.) long, of 3/16 inch (0.476 cm.) outer diameter and 0.035 inch (0.09 cm.) wall thickness spaced 2 inches (5.08 cm.) apart with orifices 0.020 inch (0.05 cm.) in diameter drilled every 2 inches (5.08 cm.) to provide 6 apertures per pipe disposed in the middle 10 inches (25.4 cm.) along the length of each apertured pipe. The apertures had a density of 36 per square foot (387 per square meter) on each side of the glass. The apertures of the pipes were arranged so that they were positioned along lines extending approximately 14 degrees from the horizontal. Each pipe extended between an upper manifold tube 50 and a lower manifold tube 52. The manifold tubes were iron tubes 56 inches (142 cm.) long and were interconnected by 28 vertically extending apertured tubes 48 to provide a cooling station 54 inches (137 cm.) long. The upper and lower manifold tubes had an outer diameter of 1 inch (2.54 cm.) and an inner diameter of ½ inch (1.27 cm.) and were connected to a series of four hydraulic hoses 54. The latter were identical in structure to hydraulic hoses 24 of the first embodiment. The hydraulic hoses 54 extended from premanifolds similar to the premanifolds 26 of the first embodiment. The latter in turn were connected through suitable valves to an enclosed system of refrigerated liquid carbon dioxide under pressure.

EXAMPLE IV

Using the embodiment of FIGS. 5 and 6, with a typical liquid carbon dioxide tank pressure of 285 ± 5 psi (847 ± 15 Kg/cm$^2$) and a pipe to glass distance of 1 inch (2.54 cm.), sheets of various thicknesses and 12 inches (30.48 cm.) square of sheet or float glass of soda-lime-silica composition were heated to the temperature range of 1200° to 1250°F. (649°C. to 677°C.) and then cooled for various periods. The results are tabulated as follows:

| TYPE OF GLASS | THICKNESS | TIME OF COOLING (SECONDS) | SURFACE COMPRESSION STRESS (PSI) |
|---|---|---|---|
| Sheet glass | 70 mils (1.8 mm) | 1.5 | 4,000 |
|  |  | 1.8 | 9,200 |
|  |  | 1.9 | 11,500 |
|  |  | 2.0 | 12,000 |
|  |  | 3.0 | 11,000 |
| Sheet glass | 90 mils (2.5mm) | 2.5 | 11,500 |
|  |  | 3.0 | 14,500 |
|  |  | 3.7 | 15,700 |
|  |  | 4.0 | 16,000 |
| Float glass | 1/8 inch (3 mm) | 2.4 | 8,900 |
|  |  | 3.5 | 16,000 |
|  |  | 4.3 | 17,700 |
|  |  | 5.0 | 18,500 |
| Sheet glass | 3/16 inch (4.8 mm) | 3.1 | 5,500 |
|  |  | 4.2 | 13,500 |
|  |  | 5.0 | 18,900 |
|  |  | 6.0 | 20,000 |

EXAMPLE V

Float glass sheet ½ inch (1.27 cm.) thick, 19 inches (48.26 cm.) wide and 25 inches (63.50 cm.) long were heated to the various temperatures reported hereafter and cooled by applying liquid carbon dioxide to arrays of apertured pipes having an inner diameter of 1.27 cm. and an outer diameter of 1.91 cm. and provided with apertures spaced at 3 inch (7.62 cm.) distances along the length of each pipe with jet nozzles, having an aperture diameter of 0.178 cm., extending from each aperture. The nozzle apertures occupied an area of 0.043% of the glass area faced by the array and the pipe arrangement provided 75% escape area.

The results obtained at different initial glass heating temperatures and different aperture to glass distances are tabulated as follows:

| AVERAGE GLASS TEMPERATURE | APERTURE TO GLASS DISTANCE | AVERAGE SURFACE COMPRESSION STRESS (P.S.I.) |
|---|---|---|
| 1240°F. (671°C.) | 5.08 cm | 34,000 |
| 1250°F. (677°C.) | 5.08 cm | 34,000 |
| 1220°F. (660°C.) | 10.16 cm | 40,000 |
| 1220°F. (660°C.) | 10.16 cm | 40,000 |
| 1205°F. (651°C.) | 7.62 cm | 40,000 |
| 1250°F. (677°C.) | 7.62 cm | 45,000 |

The sheets treated in Example V were suspended by tongs using apparatus similar to that of FIGS. 5 and 6 except that the pipes used were longer and of larger diameter. It is apparent that in treating glass sheets of greater width than those depicted in the first embodiment that the cooling medium is conveyed to the arrays of apertured pipes via wider manifolds. The apertured pipes are also made wider. However, it has been found to date that the pipes may be arranged to provide at least 50% of escape area in the area of the pipe array that faces the glass surface and less than 1% of the area facing the glass need be occupied by apertures and still provide adequate glass sheet tempering using a sublimable cooling medium.

FIG. 7 discloses a typical bending and tempering apparatus which utilizes the present invention. The illustrative apparatus incorporates a glass loading station 60, a tunnel-like glass heating furnace 61 provided with typical entrance and exit doors 62 and individually controlled electrical heating elements 63, a glass shaping station 64, a cooling station 65 comprising a skeleton support structure 66 movably mounted on cams 67 which provide orbital paths of movement for CO$_2$ blasts imparted through the apertures of apertured pipes 48 via upper and lower manifold tubes 50 and 52 from a pressurized source (not shown), and an unloading station 68 disposed in end-to-end relationship along a path of movement defined by a horizontal conveyor 70.

The conveyor 70 comprises a plurality of stub rolls 72 extending transversely of the conveyor path. The conveyor rolls are longitudinally spaced one from another. The conveyor rolls 72 are supported from a typical support structure 74 extending the length of the conveyor.

A motor and chain driving means (not shown) is used to rotate the conveyor rolls. When the conveyor rolls 72 rotate, they force a series of carriages or frame members 75 to move forwardly of the conveyor 70.

Each carriage 75 comprises an upper elongated rail member 76 adapted to rest on the conveyor rolls, members 78 extending downwardly from the upper rail member 76 to suspend self-closing tongs 46.

The latter grip a glass sheet G near its upper edge. Each carriage 75 moves along the conveyor 70 through the furnace 61, the glass shaping station 64 and the cooling station 65. The carriage movement is programmed to stop at the glass shaping station 64 for sufficient time for a pair of press bending molds 80, preferably of the type depicted in U.S. Pat. No. 3,367,764 to Samuel L. Seymour, to engage the opposite major surfaces for sufficient time to shape the glass sheet, usually 1 to 2 seconds depending on the severity of the bend to be imparted and for the press bending molds 80 to retract to enable the carriage 75 to move to the cooling station into a position of alignment between the apertured pipes 48 for a period of 2 to 30 seconds depending on the glass thickness. During this period, the shaped glass sheet is exposed to blasts of the cooling medium while the arrays of apertured pipes are moved in closed circular orbital paths in planes substantially parallel to the glass sheet surfaces, the minimum diameter of the orbits approximating the aperture to aperture spacing. It is understood that the apparatus of FIG. 7 may be modified to omit the glass shaping station 64.

It is also understood that the movement imparted to the apertured pipes may be a linear reciprocation rather than a circular orbital movement. A particular relation of apertures and linear displacements found in U.S. Pat. No. 3,600,151 to James H. Cypher and George W. Stilley is particularly effective in providing uniform cooling of glass sheets even without nozzles attached to the apertured pipes when a sublimable cooling medium such as carbon dioxide is used.

The form of the invention described represents certain illustrative embodiments thereof. It is recognized that various changes may be made without departing from the gist of the invention as defined in the claimed subject matter that follows.

I claim:

1. In a method of tempering a glass sheet comprising:
   heating said glass sheet to an elevated temperature range sufficiently high to impart a temper thereto on sudden chilling;
   applying toward opposite surfaces of said glass sheet, throughout the areal extent of said surfaces, a cooling medium containing as a primary source of cooling soft particles of a solid sublimable material having a sublimation temperature below the strain point of the glass; and
   cooling said glass sheet with said cooling medium from said elevated temperature to a temperature below the strain point of the glass; the improvement comprising
   applying said soft particles toward the opposite glass sheet surfaces from a system of apertures having a total aperture area facing each surface of said glass sheet less than 5% of the area of each said surface, said apertures being positioned sufficiently close to the adjacent surface of the glass sheet that solid particles of a sublimable material come into close proximity to said adjacent surface and being distributed through the areal extent of each said surface and spaced sufficiently close to one another that a spray of said sublimable material covers the entire area of each said surface of said glass sheet, and
   removing said cooling medium from the vicinity of said glass sheet along exhaust paths facing the glass sheet surfaces that occupy at least 50% of the areal extent of each said glass sheet surface.

2. The improvement as in claim 1, wherein said soft particles are applied from a system of apertures having a total aperture area facing each surface of said glass sheet less than 1% of the area of each said surface.

3. The improvement as in claim 2, including applying said soft particles through said system of apertures toward said glass surfaces while imparting relative motion between said glass sheet and said system of apertures.

4. The improvement as in claim 1, including applying said soft particles through said system of apertures toward said glass surfaces while imparting relative motion between said glass sheet and said system of apertures.

5. The improvement as in claim 1, wherein said soft particles are composed of solid carbon dioxide and result when liquid carbon dioxide stored in a refrigerated, pressurized condition in an enclosed container is released through said system of apertures into an environment whose temperature is sufficiently greater than that of said refrigerated condition and whose pressure is sufficiently less than said pressurized condition to form a stream of solid, soft, sublimable particles of carbon dioxide moving from each of said apertures.

6. The improvement as in claim 5, wherein said liquid carbon dioxide is stored at a pressure greater than 10 atmospheres.

\* \* \* \* \*